United States Patent
Zhang

(10) Patent No.: US 11,068,815 B2
(45) Date of Patent: Jul. 20, 2021

(54) SYSTEMS AND METHODS FOR VEHICLE SCHEDULING

(71) Applicant: BEIJING DIDI INFINITY TECHNOLOGY AND DEVELOPMENT CO., LTD., Beijing (CN)

(72) Inventor: Dingshui Zhang, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 17/067,653

(22) Filed: Oct. 10, 2020

(65) Prior Publication Data

US 2021/0027235 A1 Jan. 28, 2021

Related U.S. Application Data

(63) Continuation of application No. PCT/CN2018/082418, filed on Apr. 10, 2018.

(51) Int. Cl.
| | |
|---|---|
| *G06Q 10/06* | (2012.01) |
| *G06Q 10/04* | (2012.01) |
| *G06Q 10/08* | (2012.01) |

(52) U.S. Cl.
CPC ..... *G06Q 10/063118* (2013.01); *G06Q 10/04* (2013.01); *G06Q 10/06375* (2013.01); *G06Q 10/063114* (2013.01); *G06Q 10/0838* (2013.01)

(58) Field of Classification Search
CPC .................................................. G06Q 10/06
See application file for complete search history.

(56) References Cited

U.S. PATENT DOCUMENTS

| | | |
|---|---|---|
| 7,519,553 B2 | 4/2009 | Abe et al. |
| 8,930,116 B2 | 1/2015 | Filev et al. |
| 2008/0288985 A1 | 11/2008 | Verhaegh et al. |
| 2009/0287527 A1 | 11/2009 | Kolb et al. |

(Continued)

FOREIGN PATENT DOCUMENTS

| | | |
|---|---|---|
| CN | 101620694 A | 1/2010 |
| CN | 103177572 A | 6/2013 |

(Continued)

OTHER PUBLICATIONS

International Search Report in PCT/CN2018/082418 dated Jan. 14, 2019, 3 pages.

(Continued)

*Primary Examiner* — Kurtis Gills
(74) *Attorney, Agent, or Firm* — Metis IP LLC

(57) ABSTRACT

A method and system for improving scheduling decisions in an online to offline service. The method includes obtaining order information in an area associated with a first time period. The method also includes determining driver status information associated with a plurality of drivers in the area corresponding to a first time period. The method further includes determining a scheduling decision for the plurality of drivers in the area in the first time period based on the order information and the driver status information. The scheduling decision optimizes estimated overall profit for the online to offline service starting from the first time period.

16 Claims, 9 Drawing Sheets

(56) References Cited

U.S. PATENT DOCUMENTS

| | | | | |
|---|---|---|---|---|
| 2010/0299177 A1* | 11/2010 | Buczkowski | ......... | G06Q 50/30 |
| | | | | 705/7.13 |
| 2014/0039784 A1* | 2/2014 | Millspaugh | ............ | G08G 1/202 |
| | | | | 701/300 |
| 2014/0330739 A1* | 11/2014 | Falcone | ........... | G06Q 10/08355 |
| | | | | 705/338 |
| 2015/0242944 A1* | 8/2015 | Willard | .............. | G06Q 30/0284 |
| | | | | 705/5 |
| 2016/0109251 A1* | 4/2016 | Thakur | ................ | G01C 21/343 |
| | | | | 705/335 |
| 2017/0098377 A1* | 4/2017 | Marco | .................... | G01C 21/34 |
| 2017/0132540 A1* | 5/2017 | Haparnas | ......... | G06Q 10/06311 |
| 2017/0293950 A1* | 10/2017 | Rathod | ............. | G06Q 30/0639 |
| 2018/0032928 A1 | 2/2018 | Li et al. | | |

FOREIGN PATENT DOCUMENTS

| | | |
|---|---|---|
| CN | 104954088 A | 9/2015 |
| CN | 105608886 A | 5/2016 |
| CN | 106373387 A | 2/2017 |
| CN | 106875674 A | 6/2017 |

OTHER PUBLICATIONS

Written Opinion in PCT/CN2018/082418 dated Jan. 14, 2019, 4 pages.

* cited by examiner

500

```
┌─────────────────────────────────────────────────────────┐
│ Obtaining order information in an area associated with  │  510
│ a first time period, the area including a plurality of  │
│ geographic grids                                         │
└─────────────────────────────────────────────────────────┘
                            │
                            ▼
┌─────────────────────────────────────────────────────────┐
│ Determining driver status information in the area       │  520
│ corresponding to a first time period, the driver status │
│ information relating to a plurality of drivers in the   │
│ plurality of geographic grids                           │
└─────────────────────────────────────────────────────────┘
                            │
                            ▼
┌─────────────────────────────────────────────────────────┐
│ Determining a scheduling decision for the plurality of  │  530
│ drivers in the area in the first time period based on   │
│ the driver status information, the order information,   │
│ and an expected value of drivers that will be available │
│ for scheduling in the area starting from a second time  │
│ period                                                   │
└─────────────────────────────────────────────────────────┘
```

FIG. 5

SYSTEMS AND METHODS FOR VEHICLE SCHEDULING

CROSS-REFERENCE TO RELATED APPLICATIONS

The present application is a Continuation of International Application No. PCT/CN2018/082418 filed on Apr. 10, 2018, the entire contents of which are incorporated herein by reference in entirety.

TECHNICAL FIELD

The present disclosure generally relates to systems and methods for online to offline services, and in particular, to systems and methods for improving location-based services.

BACKGROUND

Online to offline services utilizing Internet technology have become increasingly popular because of their convenience. For the optimization of allocating of service orders generated in different regions of an area (e.g., a city), an online to offline service platform should schedule available drivers from regions with fewer service orders to regions with more service orders precisely and rationally. Therefore, it is desirable to provide systems and methods that improve location based services.

SUMMARY

In an aspect of the present disclosure, a system for determining a scheduling decision is provided. The system may include at least one storage medium storing a set of instructions and at least one processor in communication with the at least one storage medium. When the at least one processor executes the set of instructions, the at least one processor may be directed to obtain order information in an area associated with a first time period. The area may include a plurality of geographic grids. The at least one processor may also be directed to determine driver status information in the area corresponding to the first time period. The driver status information may include information relating to a plurality of drivers in the plurality of geographic grids. The at least one processor may further be directed to determine a scheduling decision for the plurality of drivers in the first time period based on the driver status information, the order information, and an expected value of drivers in the area starting from a second time period. Wherein the second time may be immediately subsequent to the first time period. The scheduling decision may optimize estimated overall profit for the online to offline service starting from the first time period. The expected value of drivers in the area starting from the second period is based on a plurality of historical time periods. The plurality of historical time periods may be associated with the second time period.

In another aspect of the present disclosure, a method for determining a scheduling decision is provided. The method may include obtaining order information in an area associated with a first time period. The area may include a plurality of geographic grids. The method may also include determining driver status information in the area corresponding to the first time period. The driver status information may include information relating to a plurality of drivers in the plurality of geographic grids. The method may further include determining a scheduling decision for the plurality of drivers in the first time period based on the driver status information, the order information, and an expected value of drivers in the area starting from a second time period. Wherein the second time may be immediately subsequent to the first time period. The scheduling decision may optimize estimated overall profit for the online to offline service starting from the first time period. The expected value of drivers in the area starting from the second period is based on historical time periods. The plurality of historical time periods may be associated with the second time period.

In yet another aspect of the present disclosure, a non-transitory computer readable medium including at least one set of instructions for determining a scheduling decision is provided. When the at least one set of instructions are executed by at least one processor, the non-transitory computer readable medium may cause the at least one processor to effectuate a method. The method may include obtaining order information in an area associated with a first time period. The area may include a plurality of geographic grids. The method may also include determining driver status information in the area corresponding to a first time period. The driver status information may include information relating to a plurality of drivers in the plurality of geographic grids. The method may further include determining a scheduling decision for the plurality of drivers in the first time period based on the driver status information, the order information, and an expected value of drivers in the area starting from a second time period. Wherein the second time may be immediately subsequent to the first time period. The scheduling decision may optimize estimated overall profit for the online to offline service starting from the first time period. The expected value of drivers in the area starting from the second period is based on historical time periods. The plurality of historical time periods may be associated with the second time period.

In some embodiments, the order information may be based on records of a plurality of historical orders associated with a plurality of historical transactions.

In some embodiments, the order information may include information relating to the plurality of historical orders in the plurality of geographic grids associated with the first time period. The information relating to each of the plurality of historical orders may include a starting location associated with the historical order, a destination associated with the historical order, and a value associated with the historical order.

In some embodiments, the driver status information may include at least one of information indicating whether a driver is available, a current location of a driver, a speed of a vehicle associated with the driver, a starting location and a destination of an order that the driver accepts, or the number of drivers in each of the plurality of geographic grids.

In some embodiments, to determine the driver status information in the area corresponding to the first time period, the at least one processor may be directed to determine the number of drivers available in the first time period based on the driver status information. The at least one processor may also be directed to determine the number of drivers that will be available in at least one future time period based on the driver status information associated with the plurality of drivers corresponding to the first time period. The at least one future time period may be later than the first time period.

In some embodiments, the scheduling decision for the plurality of drivers in the area in the first time period may be determined with an objective function. The objective function may be based on a first profit function and a second profit function. The first profit function may be based on the driver status information and the order information. The second profit function, which may be used to determined the expected value of drivers in the area starting from the second time period, may be based on the order information, the driver status information, and a plurality of value functions. The plurality of value functions may be associated with the plurality of historical time periods.

In some embodiments, to obtain the plurality of value functions, the at least one processor may be directed to initialize each of the plurality of value functions and obtain training data associated with each of the plurality of historical time periods in each of the plurality of geographic grids. The at least one processor may also be directed to determine first historical order information associated with a first historical time period of the plurality of historical time periods in a geographic grid and first historical driver status information corresponding to the first historical time period in the geographic grid based on the training data. The at least one processor may further be directed to update a first value function based on the first historical order information, the first historical driver status information, and a second value function. The first value function may indicate a value of drivers that are determined in the first historical time period that will be available in one of one or more third historical time periods of the plurality of historical time periods in the geographic grid. The second value function may indicate a value of drivers that are determined at a second historical time period of the plurality of historical time periods that will be available in the third historical time period in the geographic grid. The third historical time period is later than the first historical time period. The second historical time period may be immediately subsequent to the first historical time period.

In some embodiments, to update the first value function based on the first historical order information, the first historical driver status information, and the second value function, the at least one processor may be directed to determine the first number of drivers that are determined in the second historical time period to be available in the third historical time period in the geographic grid of the plurality of geographic grids based on the first historical driver status information. The at least one processor may be also directed to generate a historical objective function associated with the first historical time period based on first historical order information, the first historical driver status information, and the second value function. The at least one processor may further be directed to determine a left gradient and a right gradient for the historical objective function with respect to the first number of drivers. The at least one processor may still be directed to update the first value function based on the left gradient, the right gradient, the first number of drivers, and the second value function using a concave adaptive value estimation algorithm.

In some embodiments, each of the plurality of value functions may be a piecewise-linear concave function.

In some embodiments, the driver status information is from terminals associated with the plurality of drivers in the area. Wen executing the set of instructions, the at least one processor may be further directed to send messages to one or more terminals associated with the plurality of drivers based on the scheduling decision Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting schematic embodiments, in which like reference numerals represent similar structures throughout the several views of the drawings, and wherein:

FIG. 5 is a flowchart illustrating an exemplary process for determining a scheduling decision according to some embodiments of the present disclosure;

DETAILED DESCRIPTION

Figure 1:
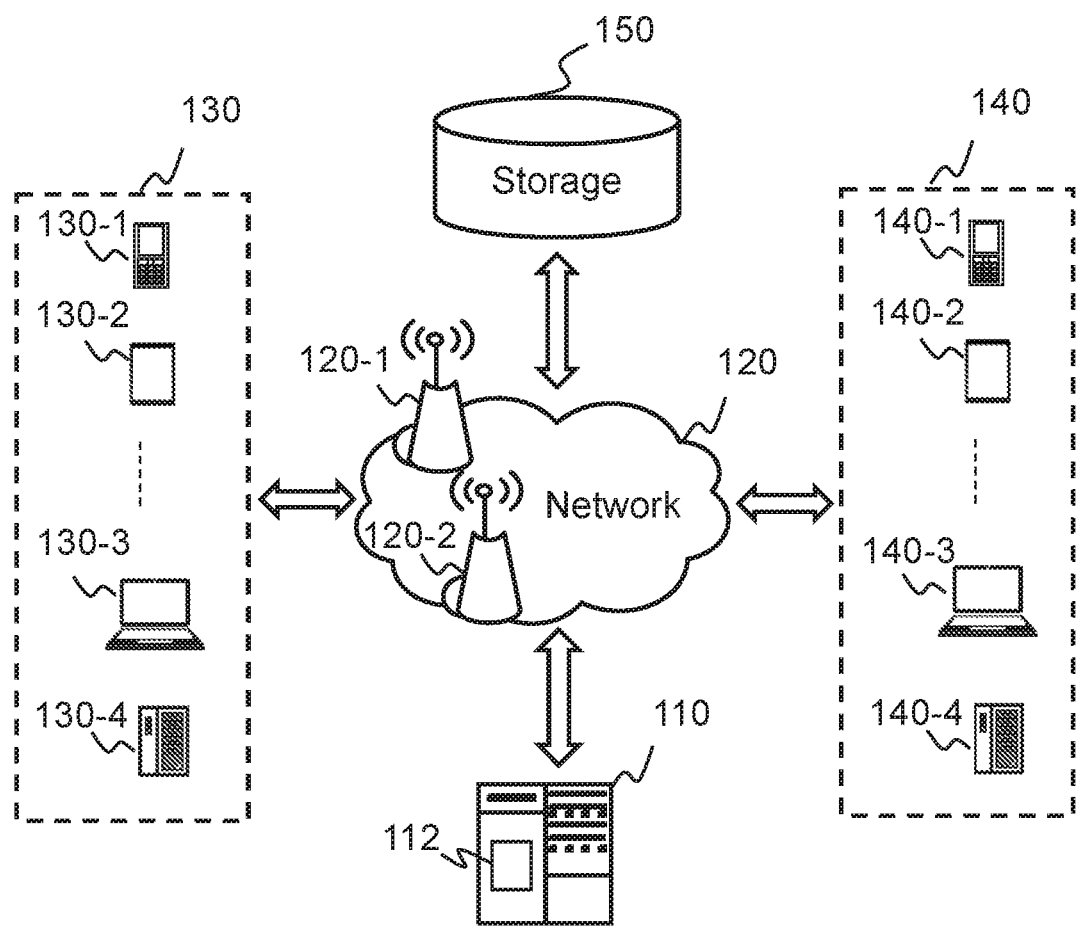
FIG. 1 is a schematic diagram illustrating an exemplary online to offline service system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the system and method in the present disclosure is described primarily regarding an online to offline transportation service, it should also be understood that this is only one exemplary embodiment. The system or method of the present disclosure may be applied to any other kind of on demand service. For example, the system or method of the present disclosure may be applied to transportation systems of different environments including land, ocean, aerospace, or the like, or any combination thereof. The vehicle of the transportation systems may include a taxi, a private car, a hitch, a bus, a train, a bullet train, a high-speed rail, a subway, a vessel, an aircraft, a spaceship, a hot-air balloon, a driverless vehicle, or the like, or any combination thereof. The transportation system may also include any transportation system for management and/or distribution, for example, a system for sending and/or receiving an express. The application of the system or method of the present disclosure may include a web page, a plug-in of a browser, a client terminal, a custom system, an internal analysis system, an artificial intelligence robot, or the like, or any combination thereof.

The term "passenger," "requestor," "service requestor," and "customer" in the present disclosure are used interchangeably to refer to an individual, an entity or a tool that may request or order a service. Also, the term "resource," "driver," "provider," "service provider," and "supplier" in the present disclosure are used interchangeably to refer to an individual, an entity or a tool that may provide a service or facilitate the providing of the service. The term "user" in the present disclosure may refer to an individual, an entity or a tool that may request a service, order a service, provide a service, or facilitate the providing of the service. For example, the user may be a passenger, a driver, an operator, or the like, or any combination thereof. In the present disclosure, "passenger" and "passenger terminal" may be used interchangeably, and "driver" and "driver terminal" may be used interchangeably.

The term "service request" and "order" in the present disclosure are used interchangeably to refer to a request that may be initiated by a passenger, a requestor, a service requestor, a customer, a driver, a provider, a service provider, a supplier, or the like, or any combination thereof. The service request may be accepted by any one of a passenger, a requestor, a service requestor, a customer, a driver, a provider, a service provider, or a supplier. The service request may be chargeable or free.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

An aspect of the present disclosure relates to systems and methods for determining a scheduling decision based on order information and driver status information. According to the present disclosure, the systems may obtain order information at a plurality of geographic grids and driver status information associated with a plurality of drivers at the plurality of geographic grids. The systems may estimate an optimal global profit and determine a scheduling decision based on the order information in the plurality of geographic grids, the driver status information associated with a plurality of drivers at the plurality of geographic grids, and a value function. The value function may be constructed as a piecewise-linear approximation. The piecewise-linear approximation of the value function may be solved/update based on a concave adaptive value estimation (CAVE) algorithm. Accordingly, it improves the accuracy of a scheduling decision and the global profit of an online to offline service platform.

It should be noted that determining a scheduling decision based on order information and driver status information, overall, is a technology deeply rooted in Internet world. The distribution of vehicles (or drivers) may be impossible without the possibility of real-time GPS positioning and real-time communication between a terminal and a server. Therefore, the technical solution disclosed in the present disclosure is also a technology deeply rooted in Internet era.

FIG. 1 is a schematic diagram illustrating an exemplary online to offline service system 100 according to some embodiments of the present disclosure. For example, the online to offline service system 100 may be an online transportation service platform for transportation services such as taxi hailing, chauffeur services, delivery vehicles, carpool, bus service, driver hiring, and shuttle services. The online to offline service system 100 may be an online platform including a server 110, a network 120, a requestor terminal 130, a provider terminal 140, and a storage 150.

In some embodiments, the server 110 may be a single server or a server group. The server group may be centralized, or distributed (e.g., server 110 may be a distributed system). In some embodiments, the server 110 may be local or remote. For example, the server 110 may access information and/or data stored in the requestor terminal 130, the provider terminal 140, and/or the storage 150 via the network 120. As another example, the server 110 may be directly connected to the requestor terminal 130, the provider terminal 140, and/or the storage 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to scheduling of drivers to perform one or more functions described in the present disclosure. For example, the processing engine 112 may obtain order information and driver status information, and determine a scheduling decision based on the order information and driver status information. In some embodiments, the processing engine 112 may include one or more processing engines (e.g., single-core processing engine(s) or multi-core processor(s)). Merely by way of example, the processing engine 112 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may facilitate the exchange of information and/or data. In some embodiments, one or more components in the online to offline service system 100 (e.g., the server 110, the requestor terminal 130, the provider terminal 140, the storage 150, and the positioning system 160) may send information and/or data to other component(s) in the online to offline service system 100 via the network 120. For example, the server 110 may obtain/acquire service request from the requestor terminal 130 via the network 120. In some embodiments, the network 120 may be any type of wired or wireless network, or a combination thereof. Merely by way of example, the network 120 may include a cable network, a wireline network, an optical fiber network, a telecommunications network, an intranet, the Internet, a local area network (LAN), a wide area network (WAN), a wireless local area network (WLAN), a metropolitan area network (MAN), a public telephone switched network (PSTN), a Bluetooth network, a ZigBee™ network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the online to offline service system 100 may be connected to the network 120 to exchange data and/or information.

In some embodiments, a requestor may be a user of the requestor terminal 130. In some embodiments, the user of the requestor terminal 130 may be someone other than the requestor. For example, a user A of the requestor terminal 130 may use the requestor terminal 130 to send a service request for a user B, or receive service and/or information or instructions from the server 110. In some embodiments, a provider may be a user of the provider terminal 140. In some embodiments, the user of the provider terminal 140 may be someone other than the provider. For example, a user C of the provider terminal 140 may use the provider terminal 140 to receive a service request for a user D, and/or information or instructions from the server 110. In some embodiments, "requestor" and "requestor terminal" may be used interchangeably, and "provider" and "provider terminal" may be used interchangeably.

In some embodiments, the requestor terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, glasses, a helmet, a watch, clothing, a backpack, a smart accessory, or the like, or any combination thereof. In some embodiments, the mobile device may include a mobile phone, a personal digital assistance (PDA), a gaming device, a navigation device, a point of sale (POS) device, a laptop, a desktop, or the like, or any combination thereof. In some embodiments, the virtual reality device and/or the augmented reality device may include a virtual reality helmet, a virtual reality glass, a virtual reality patch, an augmented reality helmet, augmented reality glasses, an augmented reality patch, or the like, or any combination thereof. For example, the virtual reality device and/or the augmented reality device may include a Google Glass™, a RiftCon™, a Fragments™, a Gear VR™, etc. In some embodiments, a built-in device in the motor vehicle 130-4 may include an onboard computer, an onboard television, etc. In some embodiments, the requestor terminal 130 may be a device with positioning technology for locating the position of the requestor and/or the requestor terminal 130.

In some embodiments, the provider terminal 140 may be a device that is similar to, or the same as the requestor terminal 130. In some embodiments, the provider terminal 140 may be a device utilizing positioning technology for locating the position of a user of the provider terminal 140 (e.g., a service provider) and/or the provider terminal 140. In some embodiments, the requestor terminal 130 and/or the provider terminal 140 may communicate with one or more other positioning devices to determine the position of the requestor, the requestor terminal 130, the provider, and/or the provider terminal 140. In some embodiments, the requestor terminal 130 and/or the provider terminal 140 may send positioning information to the server 110.

The storage 150 may store data and/or instructions. In some embodiments, the storage 150 may store data obtained from the requestor terminal 130 and/or the provider terminal 140. In some embodiments, the storage 150 may store data and/or instructions that the server 110 may execute or use to perform exemplary methods described in the present disclosure. In some embodiments, storage 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 150 may be connected to the network 120 to communicate with one or more components in the online to offline service system 100 (e.g., the server 110, the requestor terminal 130, the provider terminal 140). One or more components in the online to offline service system 100 may access the data or instructions stored in the storage 150 via the network 120. In some embodiments, the storage 150 may be directly connected to or communicate with one or more components in the online to offline service system 100 (e.g., the server 110, the requestor terminal 130, the provider terminal 140). In some embodiments, the storage 150 may be part of the server 110.

In some embodiments, one or more components in the online to offline service system 100 (e.g., the server 110, the requestor terminal 130, the provider terminal 140) may have permission to access the storage 150. In some embodiments, one or more components in the online to offline service system 100 may read and/or modify information relating to the requestor, provider, and/or the public when one or more conditions are met. For example, the server 110 may read and/or modify one or more users' information after a service is completed. As another example, the provider terminal 140 may access information relating to the requestor when receiving a service request from the requestor terminal 130, but the provider terminal 140 may not modify the relevant information of the requestor.

In some embodiments, information exchanging of one or more components in the online to offline service system 100 may be achieved by way of requesting a service. The object of the service request may be any product. In some embodiments, the product may be a tangible product or an immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used in the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle), a car (e.g., a taxi, a bus, a private car), a train, a subway, a vessel, an aircraft (e.g., an airplane, a helicopter, a space shuttle, a rocket, a hot-air balloon), or the like, or any combination thereof.

One of ordinary skill in the art would understand that when an element of the online to offline service system 100 performs, the element may perform through electrical signals and/or electromagnetic signals. For example, when a requestor terminal 130 processes a task, such as making a determination, identifying or selecting an object, the requestor terminal 130 may operate logic circuits in its processor to process such task. When the requestor terminal 130 sends out a service request to the server 110, a processor of the service requestor terminal 130 may generate electrical signals encoding the service request. The processor of the requestor terminal 130 may then send the electrical signals to an output port. If the requestor terminal 130 communicates with the server 110 via a wired network, the output port may be physically connected to a cable, which may further transmit the electrical signals to an input port of the server 110. If the requestor terminal 130 communicates with the server 110 via a wireless network, the output port of the requestor terminal 130 may be one or more antennas, which may convert the electrical signals to electromagnetic signals. Similarly, a provider terminal 140 may process a task through operation of logic circuits in its processor, and receive an instruction and/or service request from the server 110 via electrical signals or electromagnet signals. Within an electronic device, such as the requestor terminal 130, the provider terminal 140, and/or the server 110, when a processor thereof processes an instruction, sends out an instruction, and/or performs an action, the instruction and/or action is conducted via electrical signals. For example, when the processor retrieves or saves data from a storage medium (e.g., the storage 150), it may send out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 2:
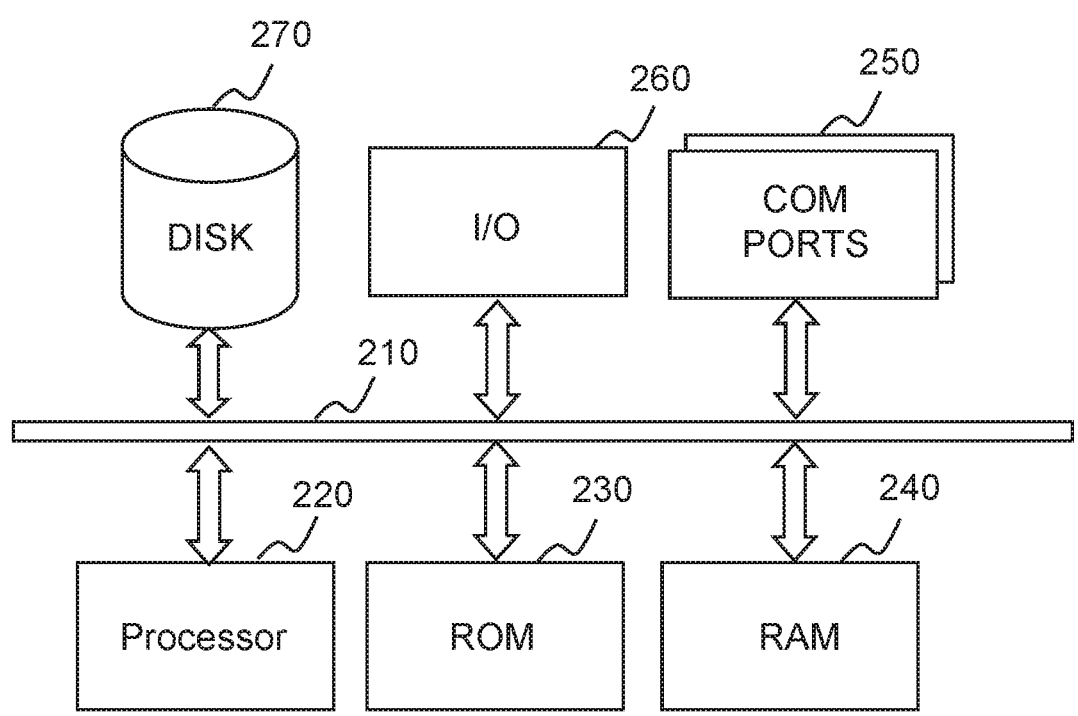
FIG. 2 is a schematic diagram illustrating exemplary hardware and/or software components of a computing device according to some embodiments of the present disclosure.

FIG. 2 is a schematic diagram illustrating exemplary hardware and software components of a computing device 200 on which the server 110, the requestor terminal 130, and/or the provider terminal 140 may be implemented according to some embodiments of the present disclosure. For example, the processing engine 112 may be implemented on the computing device 200 and configured to perform functions of the processing engine 112 disclosed in this disclosure.

The computing device 200 may be used to implement any component of the online to offline service system 100 as described herein. For example, the processing engine 112 may be implemented on the computing device, via its hardware, software program, firmware, or a combination thereof. Although only one such computer is shown, for convenience, the computer functions relating to the online to offline service as described herein may be implemented in a distributed fashion on a number of similar platforms, to distribute the processing load.

The computing device 200, for example, may include COM ports 250 connected to and/or from a network connected thereto to facilitate data communications. The computing device 200 may also include a processor (e.g., a processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The exemplary computer platform may include an internal communication bus 210, program storage and data storage of different forms, for example, a disk 270, a read only memory (ROM) 230, or a random access memory (RAM) 240, for various data files to be processed and/or transmitted by the computer. The exemplary computer platform may also include program instructions stored in the ROM 230, RAM 240, and/or other type of non-transitory storage medium to be executed by the processor 220. The method and/or process of the present disclosure may be implemented as the program instructions. The computer device 200 also includes an I/O component 260, supporting input/output between the computer and other components. The computing device 200 may also receive programming and data via network communications.

Merely for illustration, only one CPU and/or processor is described in the computing device 200. However, it should be noted that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
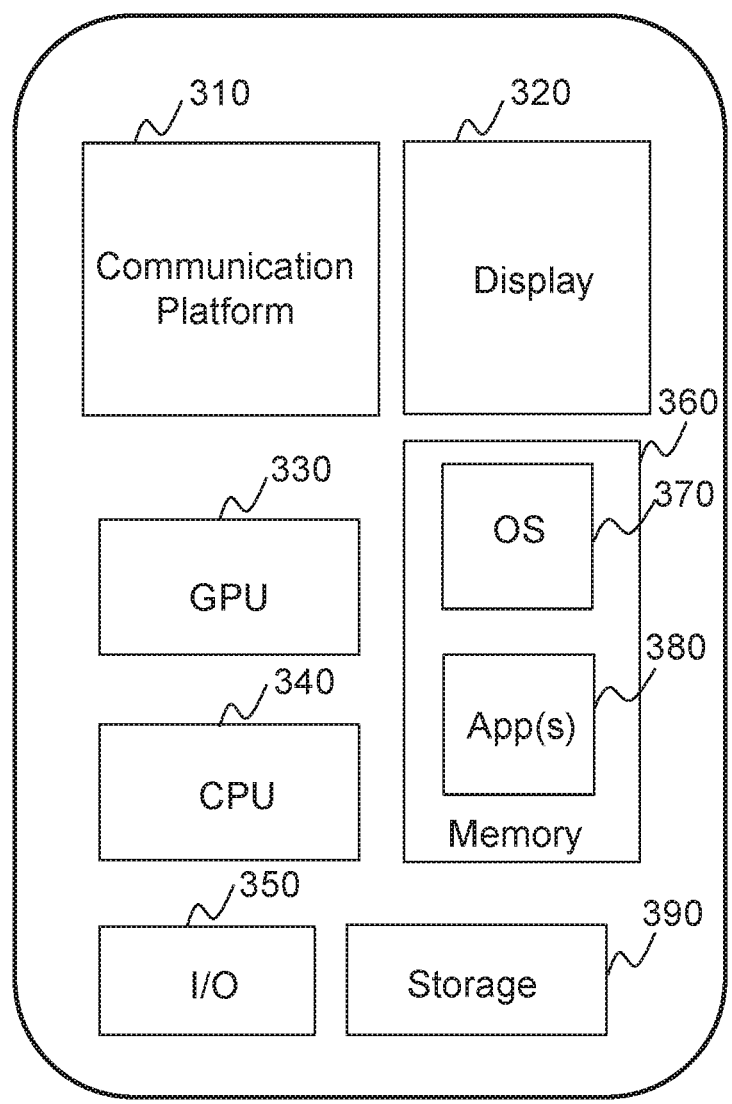
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device 300 on which the terminal 130 may be implemented according to some embodiments of the present disclosure. As illustrated in FIG. 3, the mobile device 300 may include a communication platform 310, a display 320, a graphic processing unit (GPU) 330, a central processing unit (CPU) 340, an input/output (I/O) 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™' Windows Phone™) and one or more applications 380 may be loaded into the memory 360 from the storage 390 in order to be executed by the CPU 340. The applications 380 may include a browser or any other suitable mobile apps for receiving and rendering information relating to image processing or other information from the processing engine 112. User interactions with the information stream may be achieved via the I/O 350 and provided to the processing engine 140 and/or other components of the online to offline service system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
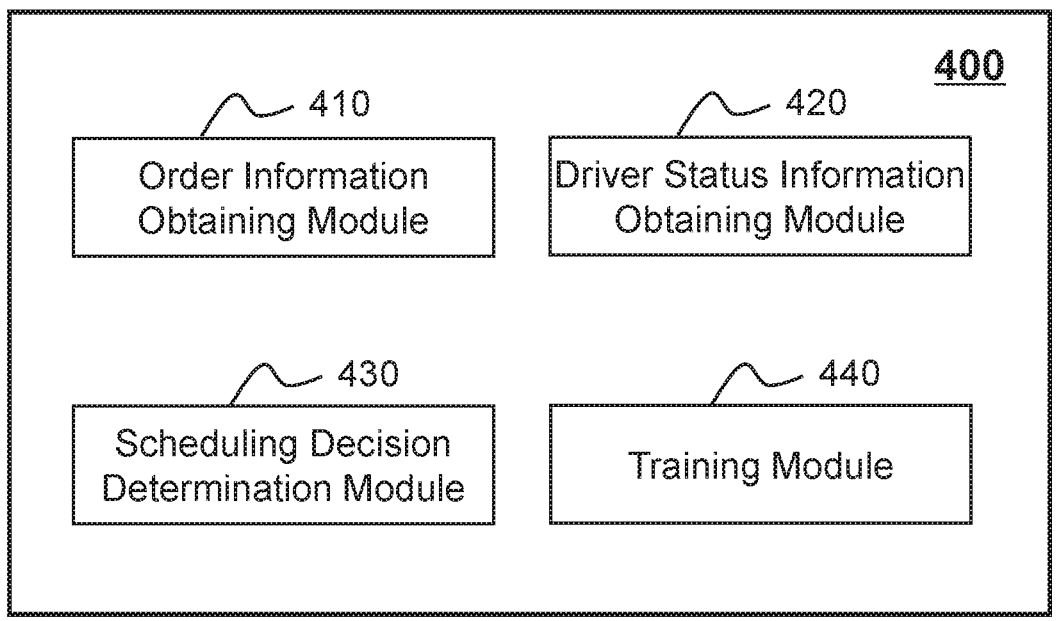
FIG. 4 is a block diagram illustrating an exemplary processing engine according to some embodiments of the present disclosure.

FIG. 4 is a block diagram illustrating an exemplary processing engine 112 according to some embodiments of the present disclosure. The processing engine 112 may include an order information obtaining module 410, a driver status information obtaining module 420, a scheduling decision determination module 430, and a training module 440.

The order information obtaining module 410 may obtain order information in an area associated with a first time period. The area may include a plurality of geographic grids. In some embodiments, the processing engine 112 (e.g., the order information obtaining module 410) may obtain the order information associated with the first time period from a storage device (e.g., the storage 150) disclosed elsewhere in the present disclosure. In some embodiments, the order information associated with the first time period may be estimated based on records of a plurality of historical orders associated with a plurality of historical transactions. The order information may include information relating to the number of historical orders, the distribution of the historical orders, starting times relating to each of the historical orders, a starting location associated with each of the historical order, a destination associated with each of the historical order, and a value associated with each of the historical order, or the like, or any combination thereof. In some embodiments, the plurality of historical orders may be generated in a historical time period of at least one historical day.

In some embodiments, a time period may correspond to a specific period of time of one day, and one day may be evenly or unevenly divided into a plurality of time periods. In some embodiments, the first time period may correspond to one of the plurality of time periods. In some embodiments, the first time period may refer to a current time period.

The driver status information obtaining module 420 may obtain driver status information in the area corresponding to the first time period. In some embodiments, the driver status information may include information relating to a plurality of drivers in the plurality of geographic grids. The driver status information may include information indicating whether a driver of the plurality of drivers is available, a current location of each of the plurality of drivers, a speed of each of the plurality of drivers' vehicle, a starting location and a destination of an order served by each of the plurality of drivers, or the like, or any combination thereof. In some embodiments, the plurality of drivers corresponding to the first time period may refer to drivers who are online for the transportation service platform (also referred to herein as online drivers). The online drivers may include available drivers and unavailable drivers in the first time period. In some embodiments, the driver status information obtaining module 420 may further determine the number of drivers that would first be available in a future time period of the first time period based on the driver status information associated with the plurality of drivers corresponding to the first time period.

The scheduling decision determination module 430 may determine a scheduling decision for the plurality of drivers in the first time period based on the driver status information, the order information, and an expected value of driver that will be available for scheduling in the area starting from a second time period. The second time period may be immediately subsequent to the first time period. In some embodiments, the scheduling decision for the plurality of drivers in the first time period may include information indicating how to allocate orders that may be generated in the first time period to the plurality of drivers. In some embodiments, drivers not available in the first time period may not be assigned to a new order in the first time period based on the scheduling decision. In some embodiments, drivers available in the first time period may be repositioned from a geographic grid to another geographic grid with or without available.

In some embodiments, the scheduling decision may be determined with an objective function. The objective function may optimize an estimated overall profit for the online to offline service system 100 starting from the first time period (e.g., from the start, end, or midpoint of the first time period) till the end of a day. A scheduling decision determined based on the objective function may earn an optimal overall profit for the online to offline service system 100. In some embodiments, the scheduling decision determination module 430 may determine the objective function based on a first profit function and a second profit function. The first profit function may refer to a short-term profit that a scheduling decision made in the first time period may produce for the online to offline service system 100 in the first time period. The second profit function may refer to an estimated long-term profit that a scheduling decision made in the first time period (e.g., $t_0$) may produce for the online to offline service system 100 starting from a next time period (e.g., $t_0+1$) of the first time period till the end of a day. In some embodiments, the scheduling decision determination module 430 may determine the second profit function based on a plurality of value functions.

The training module 440 may train a value function based on training data. In some embodiments, the training data may be data corresponding to an arbitrary time period (e.g., a day, which is used here as an example for illustration purposes) in the past (e.g., an arbitrary day in past 30 days). In some embodiments, the training data may be a statistical result (e.g., an average value or a median) of data corresponding to two or more arbitrary days in the past (e.g., two or more arbitrary days in the past 30 days). In some embodiments, the training data may include historical order information associated with any historical time period and historical driver status information associated with any historical time period. In some embodiments, the value function may determine an expected value of drivers that will be available for scheduling in the first time period and in a future time period of the first time period. In some embodiments, the future time period may be later than the first time period.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the order information obtaining module 410 and the driver status information obtaining module 420 may be combined as a single module. The combined single module may be configured to obtain both the order information and the driver status information.

FIG. 5 is a flowchart illustrating an exemplary process 500 for determining a scheduling decision according to some embodiments of the present disclosure. The process 500 may be implemented as a set of instructions (e.g., an application) stored in the storage ROM 230 or RAM 240. The processor 220 and/or the modules illustrated in FIG. 2 may execute the set of instructions, and when executing the instructions, it may be configured to perform the process 500. The operations of the illustrated process presented below are intended to be illustrative. In some embodiments, the process 500 may be accomplished with one or more additional operations not described and/or without one or more of the operations discussed. Additionally, the order in which the operations of the process as illustrated in FIG. 5 and described below is not intended to be limiting.

In 510, the processing engine 112 (e.g., the order information obtaining module 410) may obtain order information in an area associated with a first time period ($t_0$). In some embodiments, the processing engine 112 may obtain the order information associated with the first time period from a storage device (e.g., the storage 150) disclosed elsewhere in the present disclosure.

In some embodiments, a time period may correspond to a specific period of time of one day. For example, one day may be evenly or unevenly divided into a plurality of time periods and the first time period may correspond to one of the plurality of time periods. In some embodiments, the first time period may be a current time period.

The number of time periods of one day and the length of a time period may be preset and may be arbitrary. For example, the number of the time periods may include but is not limited to 144, 288, 720, or any other value. When one day is evenly divided, the length of a time period may include but is not limited to 10 minutes, 5 minutes, 2 minutes, or any other value, correspondingly. In some embodiments, the time periods in one day may be illustrated in Equation (1):

$$T=\{t|0,1,2,\ldots,(N-1)\} \quad (1)$$

wherein T refers to a set including N elements, N refers to the total number of time periods in one day, t refers to a time period, and when $t=t_0$, t refers to the first time period. For the purpose of illustration, as used herein, one day is evenly divided into 144 time periods (i.e., N=144) and the length of a time period is 10 minutes.

According to Equation (1), a specific value of variable t may correspond to a specific period of time of one day. For example, when N=144, t=0 may correspond to a time period from 00:00 a.m. to 00:10 a.m.

In some embodiments, the order information associated with the first time period may be estimated based on records of a plurality of historical orders associated with a plurality of historical transactions. The historical orders may be from terminals associated with a plurality of passengers and may be send to terminals associated with the plurality of drivers in the area. As used herein, the term "transaction" refers to a transaction of a service that a driver of a vehicle drives a passenger from one location (a starting location associated with an order) to another location (e.g., a destination associated with the order). The order information in the area associated with the first time period may include information relating to the number of historical orders in the first time period, the distribution of the historical orders in the first time period, a starting time relating to a historical order, a starting location associated with a historical order, a destination associated with a historical order, and a value associated with a historical order, or the like, or any combination thereof. The value associated with an order may refer to the amount of cost that a passenger associated with the order may pay when the order is finished by a driver associated with the online to offline service platform. In some embodiments, the plurality of historical orders may be generated in a historical time period of at least one historical day. In some embodiments, the historical time period may be a time period that is the same as the first time period. For example, the first time period may be a congestion time (e.g., 7:30 a.m.~7:40 a.m.). The processing engine 112 may estimate the order information based on records of a plurality of historical orders generated in the corresponding historical time period (e.g., 7:30 a.m.~7:40 a.m.) of at least one historical day. In some embodiments, the at least one historical day may be at least one arbitrary day of a past seven days, a past ten days, a past one month, or the like. For example, when the first time period is a time period in a workday (e.g., Monday), the processing engine 112 may estimate the order information based on records of a plurality of historical orders generated in a historical time period in a same or different workday of a past seven days, a past ten days, a past one month, or the like. In some embodiments, the processing engine 112 may estimate the order information associated with the first time period based on an average value or a median of records of the plurality of historical orders generated in the historical time period of two or more the same or different workdays of one week in the past, two weeks in the past, a month in the past, two months in the past, or the like.

In some embodiments, the order information may be associated with an area. In certain embodiments, the area may be divided into a plurality of geographic grids. The area may include but is not limited to a district of a city, a plurality of districts of a city, a city, a plurality of cities, or the like. The number of geographic grids of an area and a diameter of a geographic grid may be preset and may be arbitrary. For example, the number of geographic grids of an area may include but is not limited to 1000, 3000, 10000, or any other value, and the diameter of a geographic grid may include but is not limited to 100 m, 700 m, 1000 m, or any other value. In some embodiments, a geographic grid may be illustrated as in Equation (2):

$$i, j \in J \qquad (2)$$

wherein i and j respectively refers to a specific geographic grid and J refers to a set of all geographic grids of an area. As used herein, an area (e.g., Beijing) may be divided into 3000 geographic grids (i.e., J may include 3000 geographic grids). Grid i and grid j illustrated in Equation (2) may represent a same grid or different geographic grids.

In 520, the processing engine 112 (e.g., the driver status information obtaining module 420) may obtain driver status information associated with a plurality of drivers in the area corresponding to the first time period. In some embodiments, the driver status information may include information relating to a plurality of drivers in the plurality of geographic grids. The driver status information may include information indicating whether a driver is available, a current location of a driver, a speed of the driver's vehicle, a starting location and a destination of an order served by the driver, the number of drivers in each of the plurality of geographic grids, or the like, or any combination thereof. In some embodiments, the plurality of drivers corresponding to the first time period may refer to drivers who are online for the transportation service platform (also referred to herein as online drivers). The online drivers may include available drivers and unavailable drivers in the first time period.

In some embodiments, the processing engine 112 may further determine the number of drivers that would first be available in the first time period and in a future time period of the first time period based on the driver status information associated with the plurality of drivers in the area corresponding to the first time period. For example, based on a current location of a driver corresponding to the first time period, a speed of a vehicle driven by the driver, and a starting location and a destination of an order served by the driver, the processing engine 112 may determine the time when the driver will arrive at the destination. Similarly, for a same destination of a plurality of orders, the processing engine 112 may determine the number of drivers that can arrive at the same destination in a specific future time period of the first time period. The drivers that can arrive at the same destination in the specific future time period may become available in the specific future time period. In some embodiments, the future time period may be later than the first time period. The number of drivers that will be available in a future time period and in the first time period (when $\tau=0$) may be illustrated as Equations (3) and (4):

$$R_{tt'} = (R_{itt'})_{i \in J, t, t' \in T} \qquad (3)$$

$$t' = t + \tau, \tau = 0, 1, \ldots, \tau_{max} - 1 \qquad (4)$$

wherein $t = t_0$, $t'$ refers to a time period including the first time period (when $\tau=0$) or a future time period (when $\tau=1, \ldots, \tau_{max}$) with respect to the first time period $t_0$ and $t' \in T$, $\tau$ refers to a travel time that a driver takes from one geographic grid to another second geographic grid, $\tau_{max}$ refers to the largest travel time that a driver takes from one geographic grid to another second geographic grid, and $R_{itt'}$, as an element of $R_{tt'}$, refers to the number of drivers that will be available at geographic grid i in a time period $t'$, estimated in the first time period $t_0$.

According to Equation (4), when $\tau=0$ (i.e., $t'=t$), $R_{itt}$ may refer to the number of drivers available at geographic grid i in the first time period.

In some embodiments, the longest travel time a driver takes from one geographic grid to another geographic grid may be preset and may be arbitrary. For example, the number of time periods corresponding to the longest travel time may include but be not limited to 2, 6, 20, or any other value. In some embodiments, the preset longest travel time may be determined based on historical experience or experimental data. For example, based on historical experience or experimental data, the online to offline service system 100 may find that it is more practical to schedule a driver when the driver can move from one location (e.g., the current location of the driver) to another location (e.g., a destination associated with the scheduling) in one hour. Thus, when the duration time of a time period is ten minutes, the online to offline service system 100 may preset a value of 6 as the longest travel time, i.e., $\tau_{max}=6$.

In 530, the processing engine 112 (e.g., the scheduling decision determination module 430) may determine a scheduling decision for the plurality of drivers in the area in the first time period based on the order information, the driver status information, and an expected values of drivers that will be available for scheduling in the area starting from a second time period. The second time period may be immediately subsequent to the first time period.

In some embodiments, the scheduling decision for the plurality of drivers in the first time period may include information indicating how to allocate orders that are generated in the first time period to the plurality of drivers. In some embodiments, drivers not available in the first time period may not be assigned to a new order in the first time period based on the scheduling decision. In some embodiments, drivers available in the first time period may be repositioned from one geographic grid to another geographic grid based on the scheduling decision. In some embodiments, the scheduling decision may include a first vector and a second vector, represented by $x_t$ and $y_t$ respectively. An element of the first vector may indicate whether an order is allocated to a driver at a geographic grid in the first time period $t_0$. The number of elements of the first vector may correspond to the number of orders with a starting location at a specific geographic grid. In some embodiments, the first vector and an element of the first vector may be expressed as Equations (5) and (6):

$$x_t = (x_{lt})_{l \in \emptyset_{it}^+} \quad (5)$$

$$x_{lt} = \begin{cases} 1 & \text{an order } l \text{ is allocated to a driver } l \in \emptyset_{it}^+ \text{ in time } perid\ t \\ 0 & \text{an order } l \text{ is not allocated to a driver } l \in \emptyset_{it}^+ \text{ in time } perid\ t \end{cases} \quad (6)$$

wherein $t=t_0$, l refers to an order to be served, $\emptyset_{it}^+$ refers to a set of orders with a starting location at geographic grid i in the first time period $t_0$, and $x_{1t}$ refers to a value indicating whether an order/is allocated to a driver in the first time period $t_0$.

In some embodiments, the second vector may include the number of drivers repositioned between any two geographic grids of an area where the reposition begins in the first time period. The second vector may include a plurality of elements. An element of the second vector may indicate the number of drivers repositioned from one geographic grid to another geographic grid where the reposition begins in the first time period. In some embodiments, the second vector and an element of the second vector may be expressed as Equation (7):

$$y_t = (y_{ijt})_{i,j \in J} \quad (7)$$

wherein $t=t_0$, $y_{ijt}$ refers to the number of drivers repositioned from geographic grid i to geographic grid j where the reposition begins in the first time period $t_0$. In some embodiments, drivers repositioned from geographic grid i to geographic grid j may be available or not available.

When the scheduling decision is determined, the processing engine 112 may send messages to one or more of the terminals associated with the plurality of drivers based on the scheduling decision. When the drivers receives the messages, he or she may drives his or her vehicle to a specific geographic grids based on the messages.

In some embodiments, the scheduling decision for the plurality of drivers in the area in the first time period may be determined based on an objective function. The objective function may optimize an estimated overall profit for the online to offline service system 100 starting from the first time period (e.g., from the start, end, or midpoint of first time period) till the end of a day. A scheduling decision determined based on the objective function may earn an optimal overall profit for the online to offline service system 100. In some embodiments, the objective function may be determined based on a first profit function and a second profit function. The first profit function may refer to a short-term profit that a scheduling decision made in the first time period may produce for the online to offline service system 100 in the first time period. The second profit function may refer to an estimated long-term profit that a scheduling decision made in the first time period (e.g., $t_0$) may produce for the online to offline service system 100 starting from a next time period (e.g., $t_0+1$) of the first time period till the end of a day. In some embodiments, the objective function may be used to determine an optimal estimated overall profit that a scheduling decision made in the first time period may produce for the online to offline service system 100 starting from the first time period till the end of a day. Accordingly, the objective function may be expressed as Equation (8):

$$V_t = \max_{x_t, y_t}[g_t(x_t, y_t) + V_{t+1}] \quad (8)$$

wherein $t=t_0$, $g_t(x_t, y_t)$ refers to the first profit function, and $V_{t+1}$ refers to the second profit function.

In some embodiments, the first profit function may be determined based on the driver status information and the order information. The processing engine 112 may determine the first profit function according to Equation (9) as bellow:

$$g_t(x_t, y_t) = \Sigma_{i \in J} \Sigma_{l \in \emptyset_{it}^+} r_{lt} x_{lt} - \Sigma_{i \in J} \Sigma_{j \in J} c_{ij} y_{ijt} \quad (9)$$

wherein $t=t_0$, $r_{lt}$ refers to a reward received for serving an order $l \in \emptyset_{it}^+$ beginning in the first time period $t_0$, and $c_{ij}$ refers to a cost to reposition a driver from geographic grid i to geographic grid j.

The second profit function may be determined based on the order information associated with the first time period, the driver status information associated with the plurality of drivers in the area corresponding to the first time period, and a plurality of value functions. In some embodiments, the value function may be trained and solved based on training data (e.g., order information associated with historical time periods and driver status information associated with historical time periods). The historical time periods may correspond to the first time period. In some embodiments, the value function may determine an expected value of drivers that will be available for scheduling in the first time period and in a future time period of the first time period. In some embodiments, the future time period may be later than the first time period. Because the second profit function $V_{t+1}$ and the objective function $V_t$ may have a similar functional expression and may be solved in a same way, for illustration purposes, the following description is provided with regard to $V_t$.

Functional expression of $V_t$ may be illustrated as Equation (10):

$$V_t = \Sigma_{i \in K, t' \in (t, t+\tau_{max}-1)} V_{itt'}(R_{itt'}) \quad (10)$$

wherein $t=t_0$, $R_{itt'}$ refers to the number of drivers that will be available at geographic grid i in the time period t' including the first time period or a future time period, estimated in the first time period $t_0$, and $V_{itt'}(R_{itt'})$ refers to a value function being a function of $R_{itt'}$ and determines an expected value of drivers with the number of $R_{itt'}$ in the time period t', estimated in the first time period $t_0$. The expected value of drivers $V_{itt'}(R_{itt'})$ may indicate a profit that the drivers may create for the online to offline service platform at the geographic grid i in the time period t' from the scheduling decision made at time period t.

To determine $V_t$, the processing engine 112 may determine the value function $V_{itt'}(R_{itt'})$ for all geographic grids i, all time periods t, and all time periods t'. In some embodiments, the processing engine 112 may determine the value function $V_{itt'}(R_{itt'})$ for all geographic grids i, all time periods t, and all time periods t' in advance based on based on an off-line training process by performing one or more operations described in connection with FIG. 7. When the value function $V_{itt'}(R_{itt'})$ is determined, the processing engine 112 may determine a sum of the value functions $V_{itt'}(R_{itt'})$ for all geographical grids i, the second time periods $t=t_0+1$, and all time periods t' and determine the sum as the second profit function $V_{t+1}$ ($t=t_0$).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, step 510 and step 520 may be combined as a single step in which the processing engine 112 may both obtain the order information associated with the first time period and the driver status information associated with a plurality of drivers corresponding to the first time period simultaneously. As another example, one or more other optional operations (e.g., an execution operation) may be added elsewhere in the exemplary process 500. In the execution operation, the processing engine 112 may execute the scheduling decision and send information to the requestor terminal 130, and/or the provider terminal 140 based on the scheduling decision.

Figure 6:
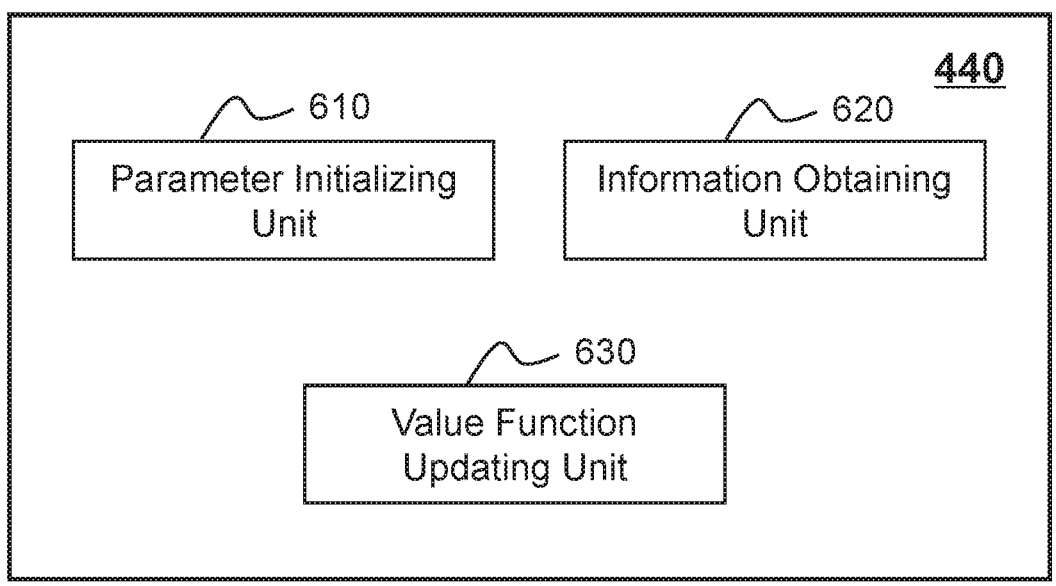
FIG. 6 is a block diagram illustrating an exemplary training module according to some embodiments of the present disclosure.

FIG. 6 is a block diagram illustrating an exemplary training module according to some embodiments of the present disclosure. The training module 440 may include a parameter initializing unit 610, an information obtaining unit 620, and a value function updating unit 630.

The parameter initializing unit 610 may initialize each value function. In some embodiments, the parameter initializing unit 610 may set an initial value (e.g., 0) for all of the plurality of value functions. In some embodiments, the parameter initializing unit 610 may also set initial values for other parameters of a value function, e.g., breakpoints of the value function.

The information obtaining unit 620 may obtain information relating to the training of a value function $V_{itt'}$ associated with the historical time period t. The information relating to the training of the value function $V_{itt'}$ may include but is not limited to a trained value function $V_{i,t+1,t'}$ associated with a historical time period (t+1) and training data associated with each of a plurality of historical time periods (t=0, 1, 2, . . . , (N−1)) in each of a plurality of geographic grids (i∈J). The information obtaining unit 620 may further determine historical order information associated with a historical time period t' and historical driver status information associated with the historical time period t' based on the training data associated with each of the plurality of historical time periods in each of the plurality of geographic grids, wherein t'=t+τ, τ=0, 1, . . . , $τ_{max}$−1.

The value function updating unit 630 may determine the value function $V_{itt'}$ based on the value function $V_{i,t+1,t'}$, the historical order information associated with the historical time period t', and historical driver status information associated with the historical time period t'. In some embodiments, the value function $V_{i,t+1,t'}$ may have been trained during previous iterations. In some embodiments, the value function updating unit 630 may update the value function $V_{itt'}$ based on the second value function $V_{i,t+1,t'}$, the historical order information associated with the historical time period t', and historical driver status information associated with the historical time period t' using a concave adaptive value estimation (CAVE) algorithm.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the information obtaining unit 620 may include two units for obtaining the value function $V_{i,t+1,t'}$ and the training data respectively.

Figure 7:
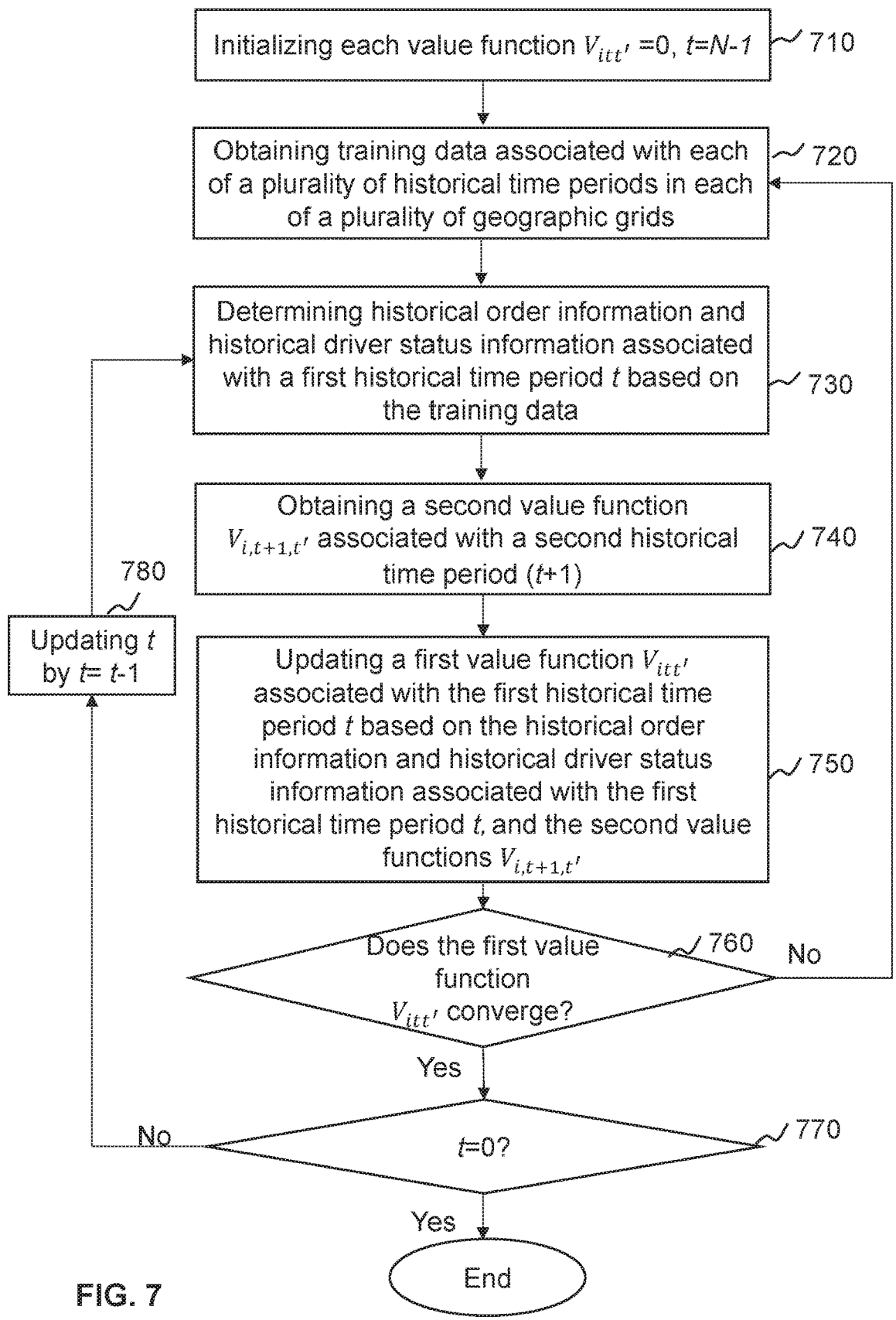
FIG. 7 is a flowchart illustrating an exemplary process for training value functions according to some embodiments of the present disclosure.

FIG. 7 is a flowchart illustrating an exemplary process 700 for training value functions according to some embodiments of the present disclosure. The process 700 may be implemented as a set of instructions (e.g., an application) stored in the storage ROM 230 or RAM 240. The processor 220 and/or the modules illustrated in FIG. 2 may execute the set of instructions, and when executing the instructions, it may be configured to perform the process 700. The operations of the illustrated process presented below are intended to be illustrative. In some embodiments, the process 700 may be accomplished with one or more additional operations not described and/or without one or more of the operations discussed. Additionally, the order in which the operations of the process as illustrated in FIG. 7 and described below is not intended to be limiting.

In 710, the processing engine 112 (e.g., the parameter initializing unit 610) may initialize each value function $V_{itt'}(R_{itt'})$, e.g., $V_{itt'}$=0. As introduced above, a value function $V_{itt'}$, may refer to a function of the number of drivers and be used to determine an expected value of drivers that are determined in a time period t to be available in a time period t'. In some embodiments, the value function may be a piecewise-linear concave function. The curve of the piecewise-linear concave function may include a plurality of breakpoints. The plurality of breakpoints may divide the piecewise-linear concave function into a plurality of linear segments. Each of the plurality of breakpoints may correspond to a linear segment with a slope of the linear segment projected from the number of drivers corresponding to the breakpoint. The slope of a linear segment of the value function may refer to the value that adding a driver may produce for the online to offline service system 100. In some embodiments, the process of training a value function may refer to determining a plurality of breakpoints for the value function and the slopes for the plurality of linear segments. In some embodiments, the processing engine 112 may determine the value function based on a concave adaptive value estimation (CAVE) algorithm. The detailed description related to the determination of the value function based on the CAVE algorithm may be found elsewhere in the present disclosure (e.g., FIG. 9 and the description thereof).

As illustrated in Equation (10), to determine the second profit function $V_t$, the processing engine 112 may determine a plurality of value functions $V_{itt'}$. For a specific time period t, to determine the second profit function $V_t$, the number of value functions to be determined may be based on the number of geographic grids of an area and the longest travel time a driver takes from one geographic grid to another geographic grid. For a day with N time periods, the processing engine 112 may determine N second profit functions $V_t$, wherein t∈T={0, 1, 2, . . . , (N−1)}. The number of geographic grids of an area, the number of time periods of one day, and the largest travel time a driver takes from one geographic grid to another geographic grid may be preset and may be arbitrary. For example, when an area is divided into 3000 geographic grids, a day is divided into 144 (N=144) time periods, and the longest travel time is within 6 time periods ($τ_{max}$=6), the number of value functions to be trained in the process 700 may be 3000*144*6. In 710, the processing engine 112 may set an initial value 0 for all of the value functions, as illustrated in Equations (11) and (12):

$$V_{itt'}(R_{itt'})_{i \in J, t' \in (t, t+\tau_{max}-1)} |_{initial\ value} = 0 \quad (11)$$

$$t' = t+\tau, \tau = 0, 1, \ldots, \tau_{max}-1 \quad (12)$$

wherein t refers to a historical time period and t∈T, i refers to a specific geographic grid, t' refers to a historical time period and t' is later than or equal to t, τ refers to a travel time a driver takes from one geographic grid to another geographic grid, and $\tau_{max}$ refers to the largest travel time a driver takes from one geographic grid to another geographic grid, the two geographic grids being the same or different; $R_{itt'}$ literally refers to the number of drivers that will be available at geographic grid i in the historical time period t', estimated in the historical time period t, according to Equation (3). Actually, for training data which are historical data, $R_{itt'}$ refers to the number of available drivers at geographic grid i in the time period t'. Similarly, $R_{i,t+1,t'}$ also refers to the number of available drivers at geographic grid i in the time period t'.

In some embodiments, the processing engine 112 may set an initial value (N−1) for time period t (t=N−1). N may refer to the total number of time periods of one day. In some embodiments, the processing engine 112 may further set initial values for other parameters of a value function $V_{itt'}(R_{itt'})$. For example, the processing engine 112 may further set an initial value for a breakpoint of the value function $V_{itt'}(R_{itt'})$.

In 720, the processing engine 112 (e.g., the information obtaining unit 620) may obtain training data associated with each of a plurality of historical time periods (t=0, 1, 2, . . . , (N−1)) in each of a plurality of geographic grids (i∈J). In some embodiments, to determine the value functions associated with a specific time period (e.g., the second time period $t_0$+1), the information obtaining unit 620 may obtain training data associated with each of a plurality of historical periods associated with the second time period $t_0$+1. The processing engine 112 may obtain the training data from a storage device (e.g., the storage 150) disclosed elsewhere in the present disclosure. In some embodiments, the processing engine 112 may obtain the training data based on data corresponding to an arbitrary day in the past (e.g., an arbitrary day in the past 30 days). In some embodiments, the processing engine 112 may obtain the training data based on a statistical result (e.g., an average value or a median) from data corresponding to two or more arbitrary days in the past (e.g., two or more arbitrary days in the past 30 days).

In some embodiments, the training data may include historical order information associated with any historical time period and historical driver status information associated with any historical time period. In some embodiments, the historical order information may include information relating to the plurality of historical orders in the plurality of geographic grids associated with the plurality of historical time periods. The information relating to one of the plurality of historical orders may include a starting location associated with each of the plurality of historical orders, a destination associated with each of the plurality of historical orders, and a value associated with each of the plurality of historical orders, or the like, or any combination thereof. In some embodiments, based on the historical order information, the processing engine 112 may determine a short-term profit that a scheduling decision made in a historical time period may produce for the online to offline service system 100 in the historical time period according to Equation (9). In some embodiments, the historical driver status information may include information relating to a plurality of drivers in the plurality of geographic grids, indicating whether a driver was available, a location of a driver, a speed of the driver's vehicle, a starting location and a destination associated with an order served by the driver, or the like, or any combination thereof. Based on the historical driver status information, the processing engine 112 may determine the number of available drivers at a geographic grid in a historical time period.

In 730, the processing engine 112 (e.g., the information obtaining unit 620) may determine historical order information associated with the historical time period t (also referred to herein as the first historical time period, and for each iteration, t refers to the first historical time period and t+1 refers to the second historical time period immediately subsequent to the first historical time period) and historical driver status information associated with the first historical time period t based on the training data associated with each of the plurality of historical time periods in each of the plurality of geographic grids. In some embodiment, the first historical time period t and the second historical time period t+1 may be specific values. For example, to determine the objection function $$V_t = \max_{x_t, y_t}[g_t(x_t, y_t) + V_{t+1}]$$

illustrated in Equation (8) for the first time period $t_0$, a second profit function $V_{t_0+1}$ may need to be trained.

The historical order information associated with the first historical time period may also include information relating to the number of historical orders in the first historical time period, the distribution of the historical orders in the first historical time period, a starting time relating to each historical order, a starting location associated with each historical order, a destination associated with each historical order, and a value associated with each historical order, or the like, or any combination thereof.

The historical driver status information associated with the first historical time period may include information indicating whether a driver is available in the first historical time period, a location of a driver in the first historical time period, a speed of the driver's vehicle in the first historical time period, a starting location and a destination of an order served by the driver, the number of drivers in a geographic grid in the first historical time period, or the like, or any combination thereof. In some embodiments, the processing engine 112 may further determine the number of drivers ($R_{i,t,t'}$) that would first be available in a future time period (t') based on the historical driver status information associated with the plurality of drivers in the area corresponding to the first historical time period (t). $R_{i,t,t'}$ literally may refer to the number of drivers that will be available at geographic grid i in the historical time period t', estimated in the historical time period t. Actually, because the training data are historical data and the number of available drivers at a geographic specific grid in a specific historical time period is certain, $R_{i,t,t'}$ refers to the number of available drivers at geographic grid i in the historical time period t'.

To determine the value function $V_{itt'}$ (also referred to herein as a first value function) associated with the first historical time period t, in 740, the processing engine 112 (e.g., the value function updating unit 630) may obtain a value function $V_{i,t+1,t'}$ (also referred to herein as a second value function) associated with a historical time period (t+1) (also referred to herein as a second historical time period). In some embodiments, the second value function $V_{i,t+1,t'}$ may have been trained during previous iterations. When the first time period is the last time period in a day (t=N−1), the processing engine 112 may designate the second value function $V_{i,t+1,t'}$=0.

In 750, the processing engine 112 (e.g., the value function updating unit 640) may update the first value function $V_{itt'}$ associated with the first historical time period t based on the historical order information associated with the first historical time period t, the historical driver status information associated with the first historical time period t, and the second value function $V_{i,t+1,t''}$. In some embodiments, the processing engine 112 may determine the number of available drivers, represented by $R_{i,t+1,t'}$, in the third historical time period t' based on the driver status information associated with the first historical time period t. The processing engine 112 may also generate a historical objective function, represented by $V_t$, associated with the first historical time period t based on historical order information associated with the first historical time period t and the second value function $V_{i,t+1,t''}$. The processing engine 112 may determine a left gradient, represented by $\pi_{i,t+1,t'}^-$, and a right gradient, represented by $\pi_{i,t+1,t'}^+$, for the historical objective function $V_t$ with respect to the number of available drivers $R_{i,t+1,t''}$. The processing engine 112 may further update the first value function $V_{itt'}$ based on the number of available drivers $R_{i,t+1,t'}$, the left gradient $\pi_{i,t+1,t'}^-$, the right gradient $\pi_{i,t+1,t'}^+$, and the second value function $V_{i,t+1,t'}$ using a concave adaptive value estimation (CAVE) algorithm. The detailed description related to the updating of the first value function may be found elsewhere in the present disclosure (e.g., FIG. 9 and the description thereof).

In 760, the processing engine 112 (e.g., the value function updating unit 640) may determine whether the first value function $V_{itt'}$ converges. The processing engine 112 may determine whether the first value function $V_{itt'}$ converges based on a preset criterion. For example, to get a converged value function, training data associated with a historical time period may be used in training for a plurality of times (e.g., 3 times). The processing engine 112 may preset an error threshold. After training data associated with a historical time period have been used in training for 3 times, the processing engine 112 may compare 3 output value functions. The processing engine 112 may determine an error based on the 3 output value functions. If the error is less than the preset error threshold, the processing engine 112 may determine that the value function converges and go to step 770. Otherwise, the processing engine 112 may go back step 720 for training one more time.

In 770, the processing engine 112 (e.g., the value function updating unit 640) may determine whether t=0. If t=0, it may mean that all value functions have been trained and the process 700 ends. Otherwise, the processing engine 112 may go to step 780 to update the value of t.

In 780, the processing engine 112 (e.g., the value function updating unit 640) may update t by t=t−1. The first value function $V_{itt'}$ associated with the first historical time period t may have been trained well by the process 700. The processing engine 112 may further update t by t=t−1 to obtain new training data for training a new value function $V_{i,t-1,t'}$ associated with a historical time period t−1.

In some embodiments, after the functional expression of $V_t$ illustrated in Equation (10) has been determined by performing one or more operations of process 700, the second profit function $V_{t+1}$ (t=$t_0$) may be determined by calculating $V_t$ based on Equation (10) in the case of t=$t_0$+1.

It should be noted that the above description is associated with training the value function $V_{itt'}(R_{itt'})$ for all geographic grids i, all time periods t, and all time periods t' based on the off-line training process. In some embodiments, when the processing engine 112 wants to determine the scheduling decision in the first time period $t_0$, the processing engine 112 may train the second profit function $V_{t_0+1}$ based on an on-line training process. The on-line training process may be similar with the process 700, but for the on-line training process, in 710, the processing engine 112 may initialize value function s wherein t∈[$t_0$+1,N−1], in 720, the processing engine 112 may obtain training data associated with historical time periods corresponding to the time periods from $t_0$+1 to N−1; steps 730 to 760 may be similar with the process 700, in 770, the processing engine 112 may determine whether t=$t_0$+1.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, step 720 may be omitted and the processing engine 112 may directly obtain the historical order information and historical driver status information associated with the first historical time period. As another example, one or more other optional operations (e.g., a storing operation) may be added elsewhere in the exemplary process 700. In the storing operation, the processing engine 112 may store a trained value function in a storage device (e.g., the storage 150).

Figure 8:
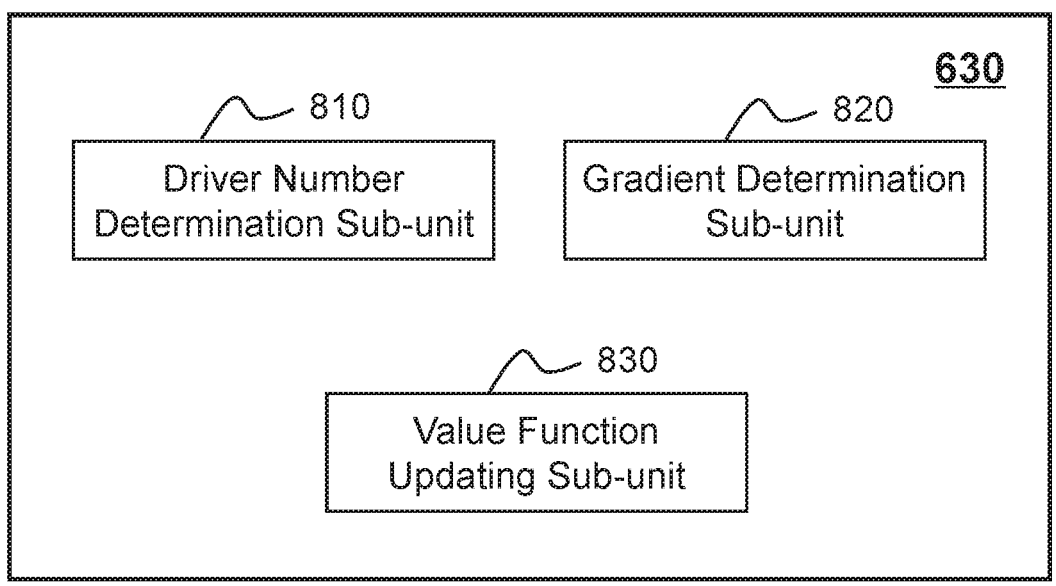
FIG. 8 is a block diagram illustrating an exemplary value function updating unit according to some embodiments of the present disclosure.

FIG. 8 is a block diagram illustrating an exemplary value function updating unit according to some embodiments of the present disclosure. The value function updating unit 630 may include a driver number determination sub-unit 810, a gradient determination sub-unit 820, and a value function updating sub-unit 830.

The driver number determination sub-unit 810 may determine the number of available drivers $R_{i,t+1,t'}$ (also referred to herein as the first number of drivers) associated with the third historical time period t' based on historical driver status information associated with the third historical time period t'. In some embodiments, the historical driver status information may include information relating to a plurality of drivers in the plurality of geographic grids. The historical driver status information may include information indicating whether a driver was available, a location of a driver, a speed of the driver's vehicle, a starting location, and a destination of an order served by the driver, or the like, or any combination thereof. The driver number determination sub-unit 810 may determine the number of available drivers at a specific geographic grid in a specific historical time period based on historical driver status information associated with the specific geographic grid and the specific historical time period. For example, for a specific geographic grid i, the processing engine 112 may determine the number of available drivers $R_{i,t+1,t'}$ associated with the third historical time period t' based on the historical driver status information associated with the third historical time period t'.

The gradient determination sub-unit 820 may generate the historical objective function $V_t$ associated with the first historical time period t based on historical order information associated with the first historical time period t and the value function $V_{i,t+1,t''}$. In some embodiments, the gradient determination sub-unit 820 may further determine a left gradient $\pi_{i,t+1,t'}^-$ and a right gradient $\pi_{i,t+1,t'}^+$ for the historical objective function $V_t$ with respect to the number of available drivers $R_{i,t+1,t''}$.

The value function updating sub-unit 830 may update the first value function $V_{itt'}$ based on the number of available drivers $R_{i,t+1,t'}$, the left gradient $\pi_{i,t+1,t'}^-$, the right gradient $\pi_{i,t+1,t'}^+$, and the second value function $V_{i,t+1,t''}$. In some embodiments, the value function updating sub-unit 830 may use a concave adaptive value estimation (CAVE) algorithm. In some embodiments, the CAVE algorithm may provide a method for estimating/updating a piecewise-linear approximation of a concave function based on gradient information of the concave function at different resource points. A resource point may refer to the number of available resources (e.g., drivers). As introduced above, the value function $V_{itt'}$ may be a piecewise-linear concave function. The processing engine 112 may update the value function $V_{itt'}$ based on the number of available drivers $R_{i,t+1,t'}$, the left gradient $\pi_{i,t+1,t'}^-$, the right gradient $\pi_{i,t+1,t'}^+$, and the second value function using the CAVE algorithm.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the gradient determination sub-unit 820 may include two units for determining the historical objective function $V_t$ and determining the left gradient $\pi_{i,t+1,t'}^-$ and the right gradient $\pi_{i,t+1,t'}^+$ respectively.

Figure 9:
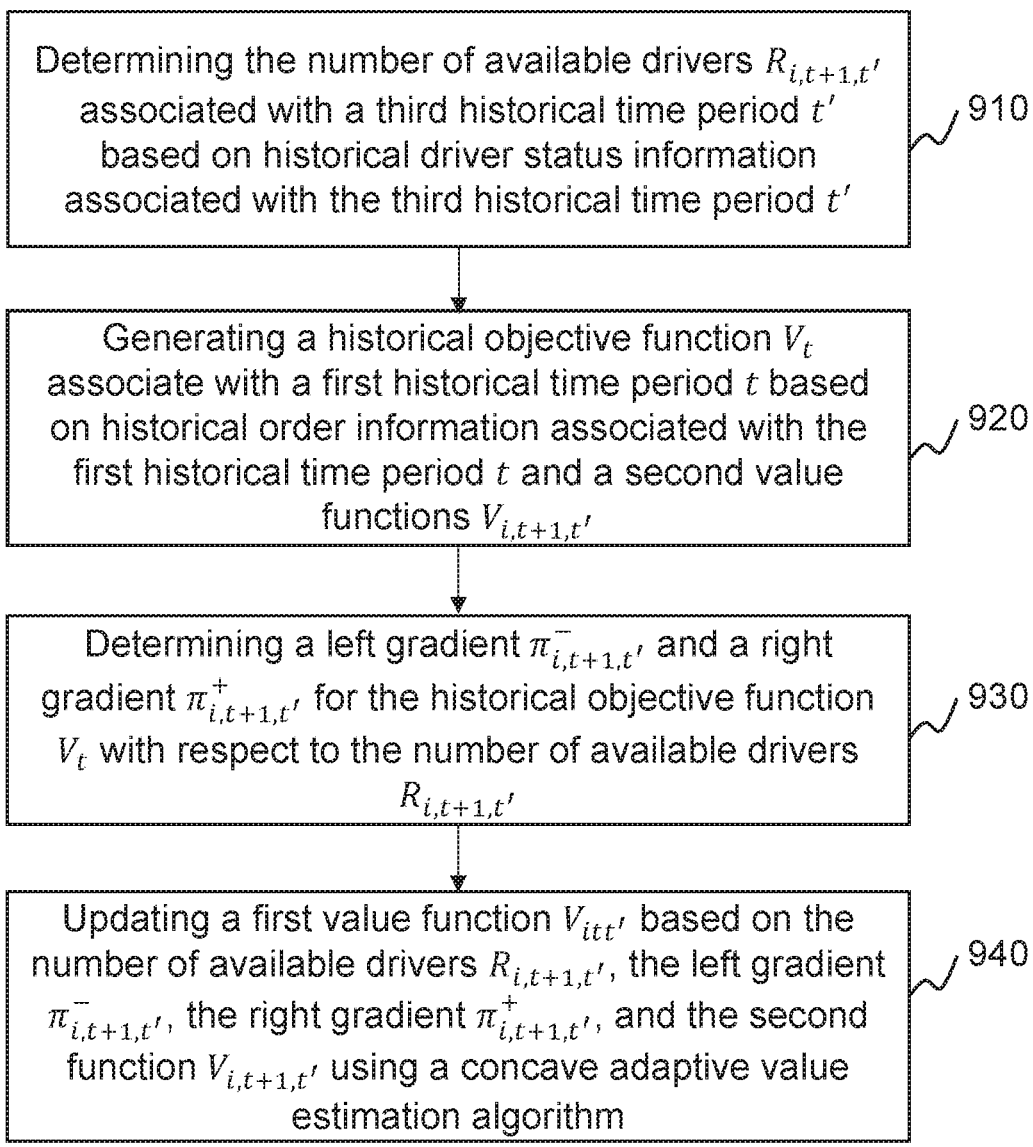
FIG. 9 is a flowchart illustrating an exemplary process for updating a value function using a Concave Adaptive Value Estimation (CAVE) algorithm according to some embodiments of the present disclosure.

FIG. 9 is a flowchart illustrating an exemplary process 900 for updating a value function based on a concave adaptive value estimation (CAVE) algorithm according to some embodiments of the present disclosure. The process 900 may be implemented as a set of instructions (e.g., an application) stored in the storage ROM 230 or RAM 240. The processor 220 and/or the modules illustrated in FIG. 2 may execute the set of instructions, and when executing the instructions, it may be configured to perform the process 900. The operations of the illustrated process presented below are intended to be illustrative. In some embodiments, the process 900 may be accomplished with one or more additional operations not described and/or without one or more of the operations discussed. Additionally, the order in which the operations of the process as illustrated in FIG. 9 and described below is not intended to be limiting.

To update the value function $V_{itt'}$, in 910, the processing engine 112 (e.g., the driver number determination sub-unit 810) may determine the number of available drivers $R_{i,t+1,t'}$ (also referred to herein as the first number of drivers) associated with the third historical time period t' based on historical driver status information associated with the third historical time period t'. In some embodiments, the historical driver status information may include information relating to a plurality of drivers in the plurality of geographic grids. The historical driver status information may include information indicating whether a driver was available, a location of a driver, a speed of the driver's vehicle, a starting location, and a destination of an order served by the driver, or the like, or any combination thereof. The processing engine 112 may determine the number of available drivers at a specific geographic grid in a specific historical time period based on historical driver status information associated with the specific geographic grid and the specific historical time period. For example, for a specific geographic grid i, the processing engine 112 may determine the number of available drivers $R_{i,t+1,t'}$ associated with the third historical time period t' based on the historical driver status information associated with the third historical time period t'.

In some embodiments, according to Equation (3) and the description thereof, in the process of training a value function based on training data generated in historical days, $R_{i,t+1,t'}$ literally may refer to the number of drivers that will be available at geographic grid i in the historical time period t', estimated in a historical time period (t+1). Actually, because training data are historical data and the number of available drivers at a geographic specific grid in a specific historical time period is certain, $R_{i,t+1,t'}$ refers to the number of available drivers at geographic grid i in the historical time period t'. Similarly, $R_{itt'}$ also refers to the number of available drivers at the geographic grid i in the historical time period t'.

In 920, the processing engine 112 (e.g., the gradient determination sub-unit 820) may generate the historical objective function $V_t$ associated with the first historical time period t based on historical order information associated with the first historical time period t and the second value function $V_{i,t+1,t'}$. The historical objective function $V_t$ may optimize an estimated overall profit for the online to offline service system 100 starting from the historical time period t till the end of a historical day. In some embodiments, according to Equation (8), the historical objective function $V_t$ may be determined based on a first historical profit function $g_t(x_t, y_t)$ and a second historical profit function $V_{t+1}$. The first historical profit function $g_t(x_t, y_t)$ may refer to a short-term profit that a scheduling decision made in a historical time period t produced for the online to offline service system 100 in the historical time period t. According to Equation (9), the first historical profit function $g_t(x_t, y_t)$ may be determined based on the historical order information associated with the historical time period t. In some embodiments, the second historical profit function $V_{t+1}$ may refer to an estimated long-term profit that a scheduling decision made in a historical time period t would produce for the online to offline service system 100 starting from a next historical time period (t+1) of the historical time period t till the end of a historical day. According to Equation (12), the processing engine 112 may determine the second historical profit function $V_{t+1}$ based on the plurality of second value functions $V_{i,t+1,t'}$ trained in process 700.

In 930, the processing engine 112 (e.g., the gradient determination sub-unit 820) may determine a left gradient $\pi_{i,t+1,t'}^-$ and a right gradient $\pi_{i,t+1,t'}^+$ for the historical objective function $V_t$ with respect to the number of available drivers $R_{i,t+1,t'}$. In some embodiments, the processing engine 112 may determine the left gradient $\pi_{i,t+1,t'}^-$ and the right gradient $\pi_{i,t+1,t'}^+$ for the historical objective function $V_t$ with respect to the number of available drivers $R_{i,t+1,t'}$ by changing the number of available drivers $R_{i,t+1,t'}$ by a preset fixed value.

In 940, the processing engine 112 (e.g., the value function updating sub-unit 830) may update the first value function $V_{itt'}$ based on the number of available drivers $R_{i,t+1,t'}$, the left gradient $\pi_{i,t+1,t'}^-$, the right gradient $\pi_{i,t+1,t'}^+$, and the second value function $V_{i,t+1,t'}$ using a concave adaptive value estimation (CAVE) algorithm. In some embodiments, the CAVE algorithm may provide a method for estimating/updating a piecewise-linear approximation of a concave function based on gradient information of the concave function at different resource points. The resource point may refer to the number of available resources (e.g., drivers).

In some embodiments, the process of estimating/updating a piecewise-linear approximation of a concave function based on the CAVE algorithm may be an iterative process. At each iteration, the CAVE algorithm may estimate/update the concave function based on a left gradient and a right gradient of the concave function at a specific resource point. As introduced above, the value function $V_{itt'}$ may be a piecewise-linear concave function. The processing engine 112 may update the first value function $V_{itt'}$ based on the number of available drivers $R_{i,t+1,t'}$, the left gradient $\pi_{i,t+1,t'}^-$, the right gradient $\pi_{i,t+1,t'}^+$, and the second function $V_{i,t+1,t'}$ using the CAVE algorithm. In some embodiments, the processing engine 112 may determine at least one new breakpoint for the first value function $V_{itt'}$ based on the CAVE algorithm. The number of breakpoints of the first value function $V_{itt'}$ may be preset or may be arbitrary such as 2, 5, 10, 20, or the like. As used herein, the preset number of breakpoints of the first value function $V_{itt'}$ may be 10, i.e., the curve of the first value function $V_{itt'}$ may be a piecewise-linear concave function with 10 segments.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the processing engine 112 may first generate the historical objective function $V_t$ and then determine the number of available drivers $R_{i,t+1,t'}$.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

I claim:

1. A system for improving scheduling decisions in an online to offline service between a plurality of drivers and a plurality of passengers, comprising:
   at least one storage medium including a set of instructions for determining a scheduling decision;
   at least one processor in communication with the at least one storage medium, wherein when executing the set of instructions, the at least one processor is directed to:

obtain order information in an area associated with a first time period, the area including a plurality of geographic grids;

determine driver status information in the area corresponding to the first time period, the driver status information including information relating to a plurality of drivers that drive the plurality of vehicles in the plurality of geographic grids, wherein the driver status information is obtained through an application loaded on a plurality of terminals associated with the plurality of drivers, and the plurality of drivers are drivers identified to be online in the first time period for the online to offline service based on real-time GPS (global positioning system) positioning technology;

determine, based on the driver status information, the order information, and an expected value of drivers that will be available for scheduling in the area starting from a second time period, a scheduling decision for the plurality of drivers in the area in the first time period, wherein, the second time period is immediately subsequent to the first time period, the scheduling decision optimizes estimated overall profit for the online to offline service starting from the first time period and the scheduling decision includes information indicating how to allocate orders to the plurality of drivers and repositioning a number of drivers from a geographic grid to another geographic grid, and the expected value of the drivers in the area starting from the second time period is based on a plurality of historical time periods, wherein the plurality of historical time periods are associated with the second time period; and send, via a network, messages to one or more of the plurality of terminals associated with the plurality of drivers based on the scheduling decision, wherein:

the scheduling decision for the plurality of drivers in the area in the first time period is determined with an objective function, the objective function is based on a first profit function and a second profit function;

the first profit function is based on the driver status information and the order information;

the second profit function, which is used to determine the expected value of the drivers in the area starting from the second time period, is based on the order information, the driver status information, and a plurality of value functions that are associated with the plurality of historical time periods, wherein each of the plurality of value functions determines the expected value of drivers that are determined in the second time period to be available in a future time period of the second time period in one of the plurality of geographic grids; and the plurality of value functions are obtained by:

initializing each of the plurality of value functions;

obtaining training data associated with each of the plurality of historical time periods in each of the plurality of geographic grids;

determining first historical order information in a first historical time period of the plurality of historical time periods in a geographic grid of the plurality of geographic grids and first historical driver status information corresponding to the first historical time period in the geographic grid based on the training data; and updating a first value function based on the first historical order information, the first historical driver status information, and a second value function, the first value function indicating a value of drivers that are determined in the first historical time period that will be available in one of one or more third historical time periods of the plurality of historical time periods in the geographic grid, the second value function indicating a value of drivers that are determined at a second historical time period of the plurality of historical time periods that will be available in the third historical time period in the geographic grid, wherein the third historical time period is later than the first historical time period, and the second historical time period is immediately subsequent to the first historical time period.

2. The system of claim 1, wherein the order information is based on records of a plurality of historical orders associated with a plurality of historical transactions.

3. The system of claim 2, wherein the order information includes information relating to the plurality of historical orders in the plurality of geographic grids associated with the first time period and the information relating to each of the plurality of historical orders includes a starting location associated with the historical order, a destination associated with the historical order, and a value associated with the historical order.

4. The system of claim 1, wherein the driver status information includes at least one of:

information indicating whether a driver is available, a current location of the driver, a speed of a vehicle associated with the driver, a starting location and a destination of an order that the driver accepts, or the number of drivers in each of the plurality of geographic grids.

5. The system of claim 1, wherein to determine the driver status information in the area corresponding to the first time period, the at least one processor is further directed to:

determine the number of drivers available in the first time period based on the driver status information; and determine the number of drivers that will be available in at least one future time period based on the driver status information associated with the plurality of drivers corresponding to the first time period, wherein the at least one future time period is later than the first time period.

6. The system of claim 1, wherein to update the first value function based on the first historical order information, the first historical driver status information, and the second value function, the at least one processor is further directed to:

determine a first number of drivers that are determined in the second historical time period to be available in the third historical time period in the geographic grid of the plurality of geographic grids based on the first historical driver status information;

generate a historical objective function associated with the first historical time period based on the first historical order information, the first historical driver status information, and the second value function;

determine a left gradient and a right gradient for the historical objective function with respect to the first number of drivers; and update the first value function based on the left gradient, the right gradient, the first number of drivers, and the second value function using a concave adaptive value estimation algorithm.

7. The system of claim 1, wherein each of the plurality of value functions is a piecewise-linear concave function.

8. The system of claim 1, wherein
the driver status information is from terminals associated with the plurality of drivers in the area, and
when executing the set of instructions, the at least one processor is further directed to send messages to one or more of the terminals associated with the plurality of drivers based on the scheduling decision.

9. A method for improving scheduling decisions implemented on a computing device having at least one processor, at least one storage medium, and a communication platform connected to a network, comprising:
obtaining order information in an area associated with a first time period, the area including a plurality of geographic grids;
determining driver status information in the area corresponding to the first time period, the driver status information including information relating to a plurality of drivers that drive the plurality of vehicles in the plurality of geographic grids, wherein
the driver status information is obtained through an application loaded on a plurality of terminals associated with the plurality of drivers, and
the plurality of drivers are drivers identified to be online drivers in the first time period for the online to offline service based on real-time GPS positioning technology;
determining, based on the driver status information, the order information, and an expected value of drivers that will be available for scheduling in the area starting from a second time period, a scheduling decision for the plurality of drivers in the first time period, wherein,
the second time period is immediately subsequent to the first time period,
the scheduling decision optimizes estimated overall profit for the online to offline service starting from the first time period and the scheduling decision includes information indicating how to allocate orders to the plurality of drivers and repositioning a number of drivers from a geographic grid to another geographic grid, and
the expected value of drivers that will be available for scheduling in the area starting from the second time period is based on a plurality of historical time periods, wherein the plurality of historical time periods are associated with the second time period; and
sending, via a network, messages to one or more of the plurality of terminals associated with the plurality of drivers based on the scheduling decision, wherein:
the scheduling decision for the plurality of drivers in the area in the first time period is determined with an objective function,
the objective function is based on a first profit function and a second profit function;
the first profit function is based on the driver status information and the order information;
the second profit function, which is used to determine the expected value of the drivers in the area starting from the second time period, is based on the order information, the driver status information, and a plurality of value functions that are associated with the plurality of historical time periods, wherein each of the plurality of value functions determines the expected value of drivers that are determined in the second time period to be available in a future time period of the second time period in one of the plurality of geographic grids; and
the plurality of value functions are obtained by:
initializing each of the plurality of value functions;
obtaining training data associated with each of the plurality of historical time periods in each of the plurality of geographic grids;
determining first historical order information in a first historical time period of the plurality of historical time periods in a geographic grid of the plurality of geographic grids and first historical driver status information corresponding to the first historical time period in the geographic grid based on the training data; and
updating a first value function based on the first historical order information, the first historical driver status information, and a second value function, the first value function indicating a value of drivers that are determined in the first historical time period that will be available in one of one or more third historical time periods of the plurality of historical time periods in the geographic grid, the second value function indicating a value of drivers that are determined at a second historical time period of the plurality of historical time periods that will be available in the third historical time period in the geographic grid, wherein the third historical time period is later than the first historical time period, and the second historical time period is immediately subsequent to the first historical time period.

10. The method of claim 9, wherein the order information is based on records of a plurality of historical orders associated with a plurality of historical transactions.

11. The method of claim 10, wherein the order information includes information relating to the plurality of historical orders in the plurality of geographic grids associated with the first time period and the information relating to each of the plurality of historical orders includes a starting location associated with the historical order, a destination associated with the historical order, and a value associated with the historical order.

12. The method of claim 9, wherein the driver status information includes at least one of:
information indicating whether a driver is available,
a current location of the driver,
a speed of a vehicle associated with the driver,
a starting location and a destination of an order that the driver accepts, or
the number of drivers in each of the plurality of geographic grids.

13. The method of claim 9, wherein the determining the driver status information in the area corresponding to the first time period includes:
determining the number of drivers available in the first time period based on the driver status information; and
determining the number of drivers that will be available in at least one future time period based on the driver status information associated with the plurality of drivers corresponding to the first time period, wherein the at least one future time period is later than the first time period.

14. The method of claim 9, wherein the updating the first value function based on the first historical order information, the first historical driver status information, and the second value function includes:
- determining a first number of drivers that are determined in the second historical time period to be available in the third historical time period in the geographic grid of the plurality of geographic grids based on the first historical driver status information;
- generating a historical objective function associated with the first historical time period based on the first historical order information, the first historical driver status information, and the second value function;
- determining a left gradient and a right gradient for the historical objective function with respect to the first number of drivers; and
- updating the first value function based on the left gradient, the right gradient, the first number of drivers, and the second value function using a concave adaptive value estimation algorithm.

15. The method of claim 9, wherein each of the plurality of value functions is a piecewise-linear concave function.

16. A non-transitory computer readable medium, comprising at least one set of instructions for determining a scheduling decision, wherein when executed by at least one processor of a computer device, the at least one set of instructions directs the at least one processor to:
- obtain order information in an area associated with a first time period, the area including a plurality of geographic grids;
- determine driver status information in the area corresponding to the first time period, the driver status information including information relating to a plurality of drivers that drive a plurality of vehicles in the plurality of geographic grids, wherein
  - the driver status information is obtained through an application loaded on a plurality of terminals associated with the plurality of drivers, and
  - the plurality of drivers are drivers identified to be online drivers in the first time period for the online to offline service based on real-time GPS positioning technology;
- determine, based on the driver status information, the order information, and an expected value of drivers that will be available for scheduling in the area starting from a second time period, a scheduling decision for the plurality of drivers in the first time period based on an objective function, wherein,
  - the second time period is immediately subsequent to the first time period,
  - the scheduling decision optimizes estimated overall profit for the online to offline service starting from the first time period and the scheduling decision includes information indicating how to allocate orders to the plurality of drivers and repositioning a number of drivers repositioned from a geographic grid to another geographic grid, and
  - the expected value of the drivers that would be available for scheduling in the area starting from the second time period is based on a plurality of historical time periods, wherein the plurality of historical time periods are associated with the second time period; and
- send, via a network, messages to one or more of the plurality of terminals associated with the plurality of drivers based on the scheduling decision, wherein:
  - the scheduling decision for the plurality of drivers in the area in the first time period is determined with an objective function,
  - the objective function is based on a first profit function and a second profit function;
  - the first profit function is based on the driver status information and the order information;
  - the second profit function, which is used to determine the expected value of the drivers in the area starting from the second time period, is based on the order information, the driver status information, and a plurality of value functions that are associated with the plurality of historical time periods, wherein each of the plurality of value functions determines the expected value of drivers that are determined in the second time period to be available in a future time period of the second time period in one of the plurality of geographic grids; and
- the plurality of value functions are obtained by:
  - initializing each of the plurality of value functions;
  - obtaining training data associated with each of the plurality of historical time periods in each of the plurality of geographic grids;
  - determining first historical order information in a first historical time period of the plurality of historical time periods in a geographic grid of the plurality of geographic grids and first historical driver status information corresponding to the first historical time period in the geographic grid based on the training data; and
  - updating a first value function based on the first historical order information, the first historical driver status information, and a second value function, the first value function indicating a value of drivers that are determined in the first historical time period that will be available in one of one or more third historical time periods of the plurality of historical time periods in the geographic grid, the second value function indicating a value of drivers that are determined at a second historical time period of the plurality of historical time periods that will be available in the third historical time period in the geographic grid, wherein the third historical time period is later than the first historical time period, and the second historical time period is immediately subsequent to the first historical time period.

* * * * *